United States Patent
Wierda et al.

(10) Patent No.: US 9,696,971 B1
(45) Date of Patent: Jul. 4, 2017

(54) METHOD AND APPARATUS FOR GENERATING AND PACKAGING INTEGRATION WORKFLOW ACTIVITIES

(71) Applicant: CA, Inc., New York, NY (US)

(72) Inventors: Kaj Wierda, Gieterveen (NL); Mark Sigler, Indian Harbour Beach, FL (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/562,835

(22) Filed: Dec. 8, 2014

(51) Int. Cl.
*G06F 9/44* (2006.01)
*G06F 9/45* (2006.01)

(52) U.S. Cl.
CPC . *G06F 8/36* (2013.01); *G06F 8/41* (2013.01)

(58) Field of Classification Search
None
See application file for complete search history.

(56) References Cited

U.S. PATENT DOCUMENTS

2006/0074736 A1* 4/2006 Shukla ............... G06Q 10/06
717/100

* cited by examiner

*Primary Examiner* — Qamrun Nahar
(74) *Attorney, Agent, or Firm* — Coats & Bennett, PLLC

(57) ABSTRACT

A tool that outputs workflows for target computing devices receives user input selecting one or more Application Programming Interfaces (APIs), a plurality of workflow activities, each of which define actions that are to be performed by the target computing device, and an application framework. Based on these selections, the tool compiles the workflow activities for execution on the target computing device based on the first application framework selected by the user, and generates a workflow activity package to comprise the compiled plurality of workflow activities. If the selected application framework is not compatible with the execution environment at the target device, the tool allows the user to select a different application framework to replace the initially selected application framework, and to re-compile the workflow activities based on the newly selected application framework.

21 Claims, 9 Drawing Sheets

METHOD AND APPARATUS FOR GENERATING AND PACKAGING INTEGRATION WORKFLOW ACTIVITIES

BACKGROUND

The present disclosure relates to Information Technology (IT) computing tools, and more particularly, to computing devices and methods for generating workflow automation packages.

Workflow automation is an orchestrated, repeatable pattern of computer-executable actions facilitated by organizing the needed functions and resources into a process or "workflow." Generally, workflows are embodied as a series of tasks or operations that are executed on the target device, and control the target computing device perform a variety of functions including, but not limited to, transforming data, providing services, and processing information. Workflows are typically constructed from a plurality of building blocks, each building block comprising code and/or data that the target device executes to perform the functions of the workflow. For example, consider a software installation process that, when executed by the target device, installs or updates the software already executing on the target device. The building blocks for such workflows may comprise, for example, code and/or data that allows the target device to perform Create, Read, Update, and Delete (CRUD) operations, and/or other operations.

Conventionally, there is a fairly high degree of knowledge and specific skill required for creating workflows. Particularly, computer programmers who create workflows should be well-versed in the various technologies related to the target device, such as the many different Application Programming Interfaces (APIs) and application frameworks in which such workflows are expected to operate.

BRIEF SUMMARY

The present disclosure provides a computer-implemented method, apparatus, and corresponding computer readable storage medium for generating workflow activity packages that are executed on target computing devices. In one embodiment, a computer-implemented method for generating such a package comprises selecting, responsive to receiving user input at a Graphical User Interface (GUI), an Application Programming Interface (API), a first application framework from among a plurality of application frameworks displayed to the user, and a plurality of workflow activities that are compliant with the API. Each workflow activity comprises code defining one or more actions to be performed by a target computing device in concert with the selected API, and the first application framework comprises a reusable set of software components on top of which the workflow activities will execute on the target computing device.

The method further comprises compiling the workflow activities for execution on the target computing device based on the first application framework selected by the user. Once compiled, the method calls for generating the workflow activity package to comprise the compiled plurality of workflow activities.

In another embodiment, the present disclosure also provides a computing device comprising a display and a processing circuit. The display is configured to display a graphical user interface (GUI) for a tool to a user. The tool is configured to generate a workflow activity package for execution on a target computing device based on user input received by the GUI. The processing circuit is, responsive to receiving the user input at GUI, configured to select an Application Programming Interface (API), select a first application framework for building the plurality of workflow activities into the workflow activity package, and select a plurality of workflow activities that are compliant with the API.

The first application framework comprises a reusable set of software components and is selected by the user from among a plurality of application frameworks displayed by the GUI. Further, each workflow activity comprises code that defines one or more actions to be performed by the target computing device, and is compliant with the selected API. The tool compiles the workflow activities for execution on the target computing device based on the first application framework selected by the user, and generates the workflow activity package to comprise the compiled plurality of workflow activities.

Additionally, the present disclosure also provides, in one embodiment, a computer-readable storage medium comprising computer-readable code. The code, when executed by a processing circuit on a computing device, configures the processing circuit to display a graphical user interface (GUI) for a tool to a user, wherein the tool is configured to generate a workflow activity package for execution on a target computing device, and select, responsive to receiving user input at the GUI, an Application Programming Interface (API), a first application framework for building the plurality of workflow activities into a workflow activity package, and a plurality of workflow activities that are compliant with the API.

Each workflow activity comprises source code defining one or more actions to be performed by a target computing device. The first application framework comprises a reusable set of software components and is selected by the user from a plurality of application frameworks displayed by the GUI. The code further controls a processing circuit on a computing device to compile the workflow activities for execution on the target computing device based on the first application framework selected by the user, and generate the workflow activity package to comprise the compiled plurality of workflow activities.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
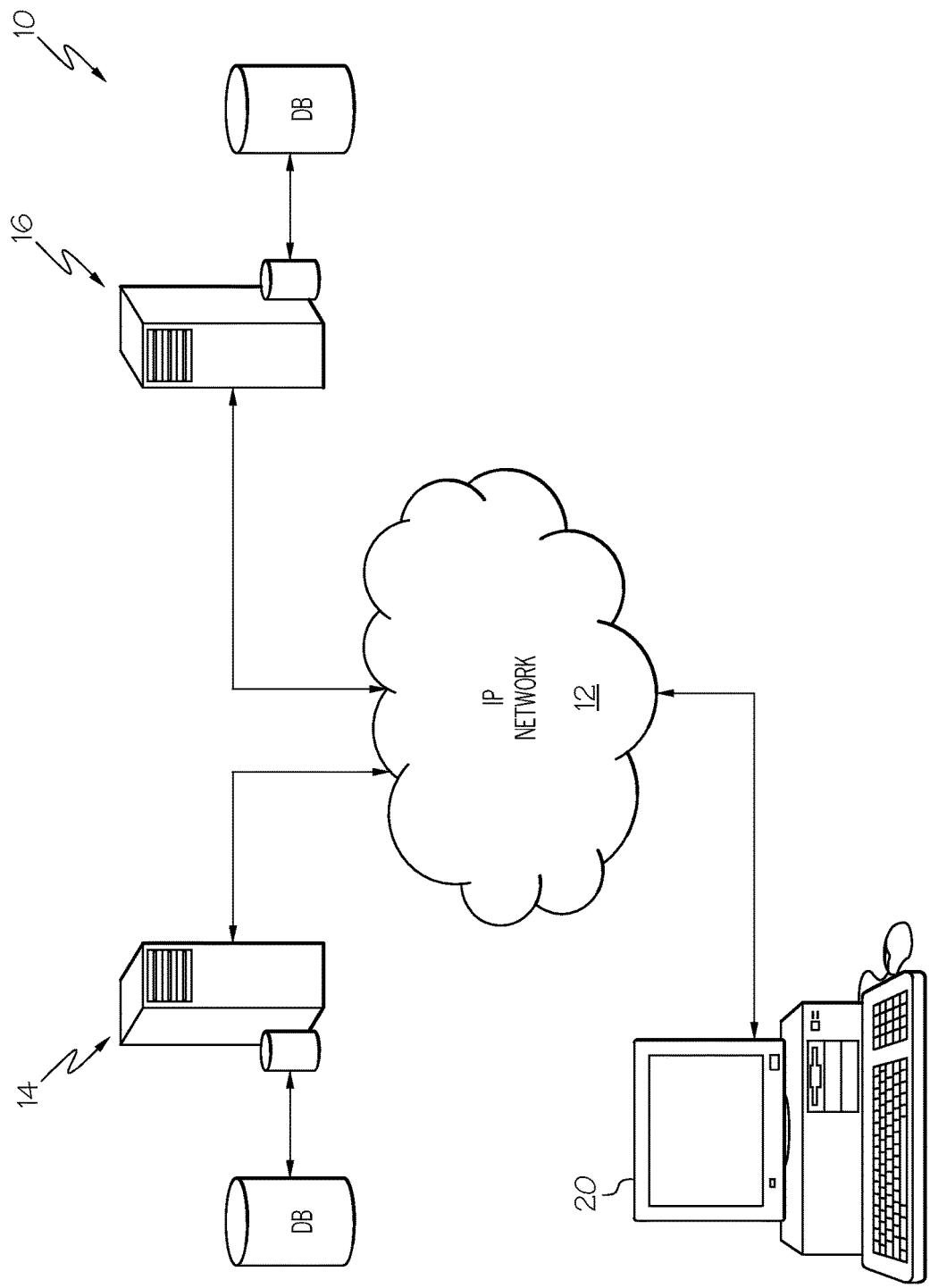
FIG. 1 is a block diagram illustrating some components of a communications network configured according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a device, a computer-readable storage medium, and corresponding computer-implemented method for compiling a workflow activity package for execution on a target computing device. The workflow activity package comprises a workflow made up of a plurality of various building blocks or "workflow activities." Each workflow activity in the workflow comprises code and/or data defining one or more actions that are to be executed on the target computing device. In operation, a user is presented with a Graphical User Interface (GUI) by a Rapid Development Kit (RDK) tool executing as a standard web application on a computing device. The GUI displays elements, such as the workflow activities, from which the user can select to include in the workflow and build into the workflow activity package.

In more detail, the GUI displays a plurality of Application Programming Interfaces (APIs) and a plurality of application frameworks in addition to the plurality of workflow activities. Each API is different and defines functions that the workflow activities may invoke when they are executed on the target device. The application frameworks define the various different framework components on top of which the workflow activities are expected to operate. Based on information regarding the functions to be performed by the workflow, the execution environment at the target computing device, and the like, the user selects one or more desired APIs and a desired application framework. The user also selects, via the GUI, a plurality of workflow activities, each of which is compliant with at least one of the selected APIs. Once the workflow activities, APIs, and the framework are selected, the RDK tool generates corresponding source code, compiles the source code, and places the compiled source code defining the workflow activities into a workflow activity package. The package is then deployed to, or installed on, the target computing device for execution on the target computing device.

The tool of the present disclosure enables 'sysadmin' type personnel, who are typically subject matter experts for a particular technology and very often have either scripting or Web services skills (or both), to rapidly create new workflow activities without requiring a specific coding skill set or deep knowledge of the underlying framework on which the tool operates. Additionally, the tool allows users-at-large to create new or modified custom workflow activities for use with the tool. Some users may create such customized workflow activities for use in their own workflows without having to endure a lengthy and complicated training and code review process. Other users, such as those that are part of a development community, for example, may create or modify workflow activities, and then contribute those custom work activities to a library for use and/or sale to other users. In addition, the tool of the present disclosure accelerates the creation and delivery of workflow activities for use on a target device. Particularly, the tool of the present disclosure performs the more complicated and mundane tasks associated with generating workflow activities that are used in the creation of workflow processes that users typically perform on conventional systems, while helping to ensure quality of the workflow activities. This leaves users free to concentrate on specific aspects of extending the functionality of the code that comprises the workflow activities.

Turning now to the drawings, FIG. 1 is a block diagram illustrating some components of a communications network 10 configured according to one embodiment of the present disclosure. In this embodiment, network 10 comprises a packet-based data network 12, such as the Internet and/or one or more private or public packet-based networks, for example, communicatively connecting an application server 14 and a target computing device 16 with a local client computing device 20. Each of the application server 14 and the target computing device 16 may further connect to external memory devices, such as one or more databases (DBs), for example, that store data and programs used by those devices.

In one embodiment, the RDK tool (i.e., a software application program) executes on the application server 14, or locally on client computing device 20. As previously described, the RDK tool is a development tool that provides the GUI to client computing device 20. The GUI displays the available APIs, the available application frameworks, and the available workflow activities to the user. As previously described, the user selects one or more desired APIs, frameworks, and workflow activities from those displayed by the GUI to build the workflow activity package for execution on the target device 16. Once built, the workflow activity package is delivered to the target device 16 and executed thereon to perform the workflow functions and activities that comprise the package.

Figure 2:
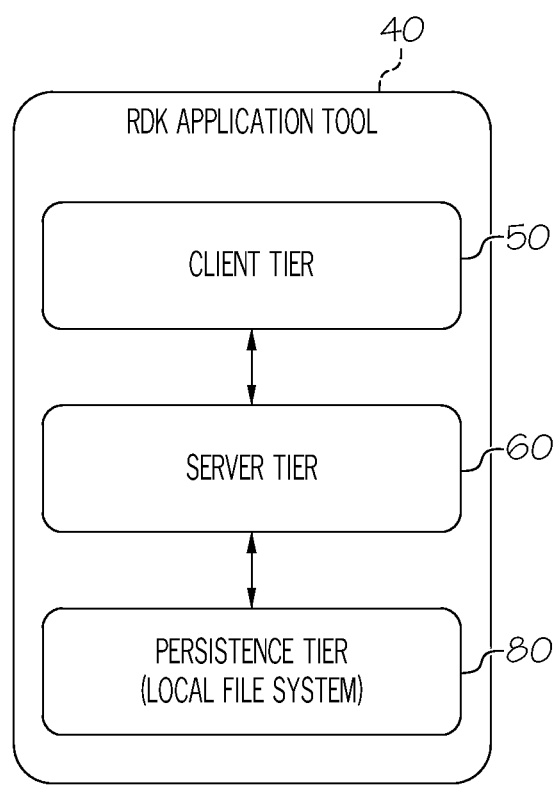
FIG. 2 is a block diagram illustrating a three-tier architecture of a Rapid Development Kit (RDK) tool according to one embodiment of the present disclosure.

FIG. 2 is a block diagram illustrating a possible architecture of a Rapid Development Kit (RDK) tool 40 configured according to one embodiment of the present disclosure. The RDK tool 40 provides the GUI that allows the user to select the APIs, the frameworks, and the workflow activities as previously described, as well as the logic and instructions that generate the workflow activity package based on the user selections. This embodiment of the RDK tool 40 comprises a three-tiered architecture; however, this is for illustrative purposes only. As those of ordinary skill in the art will appreciate, other architectures for such tools 40 are also possible.

The RDK tool 40 of FIG. 2 is, as stated above, may be designed as a standard web application having multiple tiers. In this embodiment, RDK tool 40 comprises a client tier 50, a server tier 60, and a persistence tier (or local file system) 80. The client tier 50 is hosted locally in the user's browser environment, which provides native support for code written in languages such as HTML5, JAVASCRIPT, and CSS. In one embodiment, client tier 50 is constructed as a single page Angular application and is configured to access server tier 60 via a RESTful interface, for example. In this embodiment, client tier 50 has no direct access to persistence tier 80, but may access the persistence tier 80 indirectly by invoking one or more functions in the server tier 60.

The GUI described above is contained within the client tier 50, and comprises a plurality of functions that allow the user to interact with the RDK tool 40. By way of example only, client tier 50 comprises a framework, such as AngularJS, that facilitates client-side construction of the workflow activities, modularization, service management, and data binding. In addition, client tier 50 may comprise support for certain other components including, but not limited to, BOOTSTRAP and UI BOOTSTRAP, which provides a set of AngularJS directives that implement some common, "out-of-the-box" BOOTSTRAP compatible components, and Less CSS, which assists users in building HTML stylesheets.

The server tier 60 communicates with both the client tier 50 and the persistence tier 80 using any means known in the art, and provides the standard web application services to the client tier 50 to serve static content. While the static content may comprise any content needed or desired, such content may include, but is not limited to, images, html files, and scripts. In addition to these functions, the server tier 60 is configured to provide a RESTful API to support the RDK tool 40 business logic.

In one embodiment, the server tier 60 also comprises an ORACLE JAVA runtime environment under which the RDK tool 40 executes. An APACHE TOMCAT server module provides the static content and a JEE Servlet container to implement the RDK tool 40 business logic, while a Java Development Kit may be employed to provide a Java compiler used to compile the workflow activity packages into Java class files. APACHE CXF/JAX-RS provides support for using annotations for Rest XML, Rest JSON, and SOAP, and in at least one embodiment, utilizes a WOODSTOX STAX parser. An APACHE VELOCITY component facilitates the user's ability to generate the workflow activities using templates, and ensures a separation between the logic of a code generator that generates the code for the workflow activities, and the generated code. Further, the server tier 60 may also comprise an APACHE ANT module used for running a back end automated build on the workflow activity package.

This persistence tier 80 comprises the native file system of the operating system (OS) of the target computing device 16. In addition to other functions, the persistence tier 80 is configured to provide storage resources for all of the workflow activity packages, as well as any associated metadata.

Figure 3:
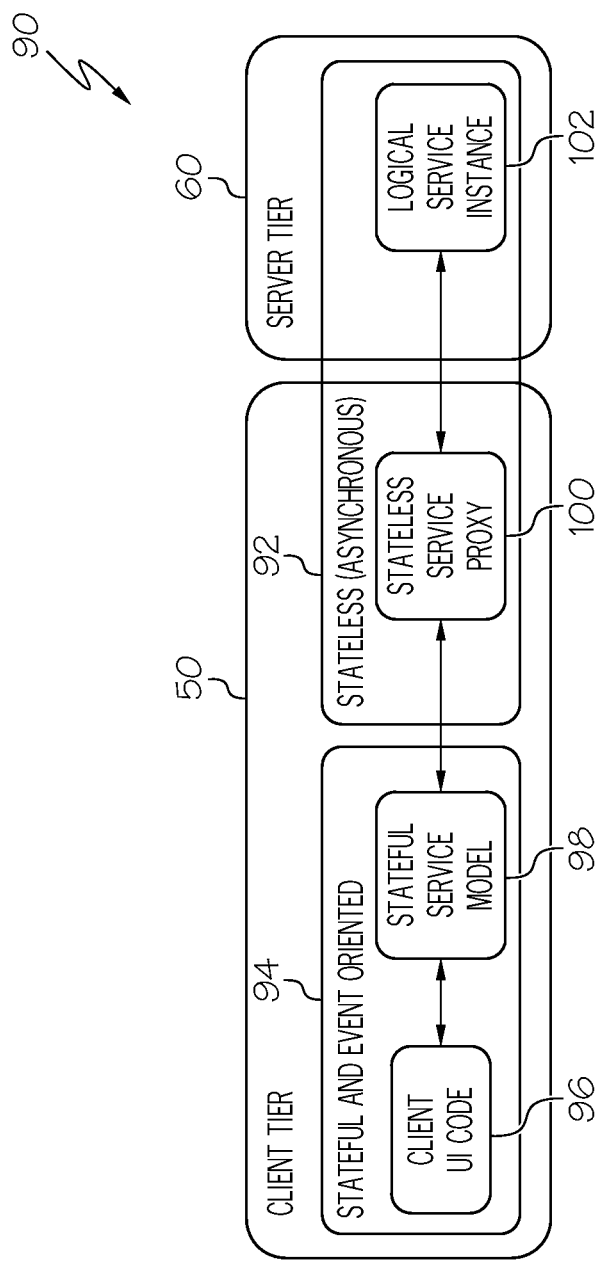
FIG. 3 is a block diagram illustrating a business proxy pattern according to one embodiment of the present disclosure.

FIG. 3 is a block diagram illustrating a business proxy pattern 90 according to one embodiment of the present disclosure. As seen in FIG. 3, the client tier 50 consumes restful services provided by the server tier 60 by accessing those services via a stateless JAVASCRIPT business proxy. More particularly, the business proxy pattern 90 in this embodiment exposes a stateless, asynchronous promise-based interface 92 that hides the details of transport and protocol of messages and data communicated between the client tier 50 and the server tier 60. This stateless asynchronous interface 92 comprises public methods. Further, the semantics of these public methods match the business logic of the service API and are agnostic of other technical details.

The business proxy pattern 90 in this embodiment also comprises a stateful and event oriented interface 94 that communicates with the stateless asynchronous interface 92. The functions that comprise the stateful and event-oriented interface 94 are provided by the client tier 50 and comprise the Client UI code 96 and a Stateful Service Model 98. The functions that comprise the stateless asynchronous interface 92 comprise a Stateless Service Proxy 100 and a Logical Service Instance 102, which in this embodiment, are distributed across both the client tier 50 and the server tier 60.

The Client UI code 96 comprises presentation logic for the GUI. In one embodiment, the Client UI code 96 comprises components including Bootstrap based Angular Directive components, Service components, Markup and Controller components, Filter components, and the like. These components are configured to convert the business logic of the server tier 60 into a rich user experience via the GUI.

The Stateful Service Model 98 is configured to encapsulate the logic of the Stateless Service Proxy 100. Not all services will require stateful processing, however. Some other functions provided by this component include, but are not limited to, caching and singleton behaviors such as session and authentication management.

The Stateless Service Proxy 100 comprises a javascript proxy that executes within the user's browser environment. In this embodiment, these functions are stateless, like the Logical Service Instance 102 instances they proxy, but will recast the synchronous restful business interfaces into their asynchronous, object oriented, promise-based equivalents. The services provided by the Stateless Service Proxy 100 are registered Angular services, and therefore, Angular may be utilized to manage these services throughout their lifecycles. As stateless services, each consumer may have its own instance.

The Logical Service Instance 102 comprises code and logic configured to provide the business logic required to use the service. They will expose this logic in a RESTful interface. If there are other consumers of the RDK tool 40, it will be these interfaces that are consumed. The Logical Service Instance 102, which may be written in Java, for example, may be hosted by the Tomcat Servlet Container and adhere to the JAX-RS standard. This allows the Logical Service Instance 102 to leverage the Apache CXF framework to simplify and standardize the writing of RESTful interfaces.

Figure 4:
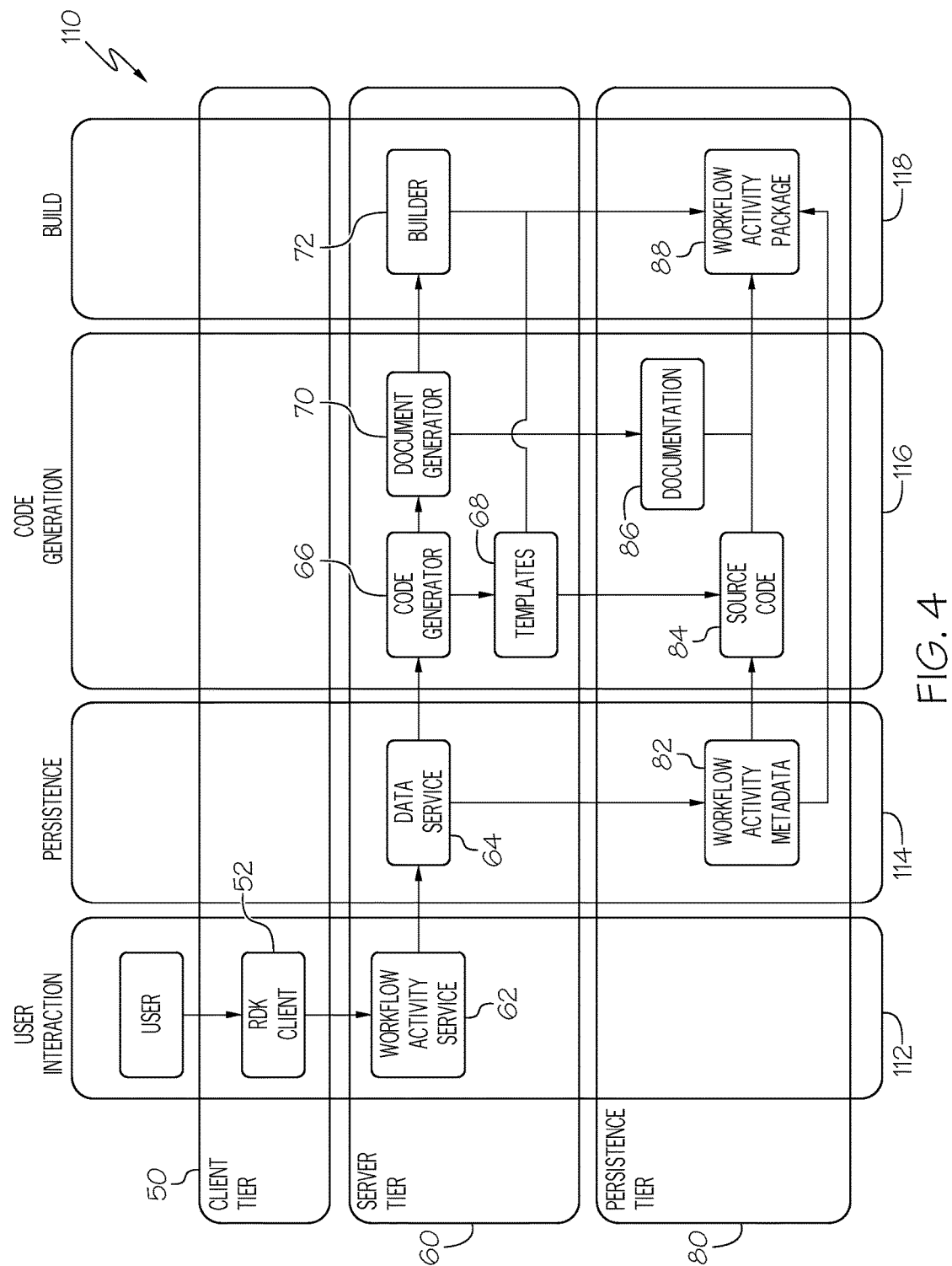
FIG. 4 is a block diagram illustrating a build pipeline according to one embodiment of the present disclosure.

FIG. 4 is a block diagram illustrating a build pipeline 110 for generating and compiling a workflow activity package according to one embodiment of the present disclosure. As seen in FIG. 4, the pipeline of this embodiment comprises four different, sequential stages. A User Interaction (UI) stage 112, a Persistence stage 114, a Code Generation stage 116, and a Build stage 118.

The UI stage 12 comprises the logic and data that facilitates the interaction between the user, the client tier 50, and the server tier 60. Particularly, in the UI stage 112, the user interacts with the RDK tool 40 via a RDK client module (i.e., the GUI) (box 52) to create, edit (e.g., update), and manage the workflow activities and the workflow activity packages. By way of example, the RDK client module is configured to communicate with a workflow activity services module (box 62) in the server tier 60 to select, responsive to user input, various APIs, provide input parameters, define an execution payload, define one or more output parameters along with optional filters, define error conditions, and the like. Once defined, users are able to test, via the RDK client, execution payloads in the context of the input parameters, and inspect the output of any defined API calls. If the user has defined any filters, the RDK client may filter the outputs, and assign the filtered output values to the defined output parameters. Advantageously, testing the execution payload also helps to validate any optional error conditions that are defined by the user. The user may also store the workflow activities in a memory along with the selected and defined parameters using the RDK client module.

In the Persistence stage 114, the application server 14 stores the updated workflow activities and/or metadata associated with those activities to storage, such as in a DB. More particularly, a data service module (box 64) receives the data, such as the metadata, workflow activities, and workflow activity packages defined by the user using the RDK client, from the workflow activity service module (box 62). As described in more detail below, the data service module (box 64) sends the data to a code generator module (box 66), but may also send that data to a workflow activity metadata module (box 82) in the persistence tier 80. Sending the data to the workflow activity metadata module (box 82) enables users to easily port workflow activities, as well as entire workflow activity packages, to other workflow activities and packages.

In one embodiment, for example, a user can enter a command at the RDK client to copy the contents of a working folder comprising the workflow activities and associated metadata for use in another workflow. In response, a workflow activity metadata module (box 82) receives the data, and then communicates the data to a source code module (box 84), and/or to a workflow activity package module (box 88). Upon receipt, these modules can insert or otherwise utilize the data for other workflow activities and/or workflow activity packages.

The Code Generation stage 116 comprises the functions that are performed by a code generator module (box 66), a template module (box 68), and a documentation generator (box 70) in server tier 60, as well as the previously mentioned source code module (box 84) and a documentation module (box 86) in the persistence tier 80.

In the Code Generation stage 116, code generator module (box 66) at the server tier 60 receives metadata from the data service module (box 64), and merges that metadata with workflow activity code templates at a workflow activity template module (box 68). The merged data is then provided to the source code module (box 84) to produce the source code for the workflow activity packages. Additionally, a document generator module (box 70) may be included to generate appropriate documentation for the workflow activity and/or packages from the data received at the code generator module (box 66). In such embodiments, the document generator module (box 70) may provide its data to a documentation module (box 86) in the persistence tier 80 to be merged with, or included in, the workflow activity and/or the workflow activity package that is output by the source code module (box 84). Such documentation may identify or describe, for example, the various parameters and functions of a given workflow activity or workflow activity package so that other users can utilize that code.

In at least one embodiment, templates can be replaced and/or updated to perform code generation that is compatible with other selected IT orchestration/automation frameworks. Thus, embodiments of the present disclosure are not limited to only a single pre-defined framework, but rather, can support multiple different frameworks associated with other IT tools. Optionally, the generated source code can be modified and/or customized using any applicable Integrated Development Environment (IDE).

In the final stage, or Build stage, the server tier 60 builds the workflow activity package from the identified workflow activities. More particularly, a builder module (box 72) at the server tier 60 receives data from the document generator module (box 70) and the template module (box 68), and assembles that data to generate the workflow activity package (box 88) in a format that can be deployed to the target IT orchestration/automation toolset. In at least one embodiment, the format for the resultant workflow activity package is determined by the framework associated with the selected IT orchestration/automation toolset. However, in other embodiments, the format is determined by a Software Development Kit (SDK) selected by the user.

Figure 5A:
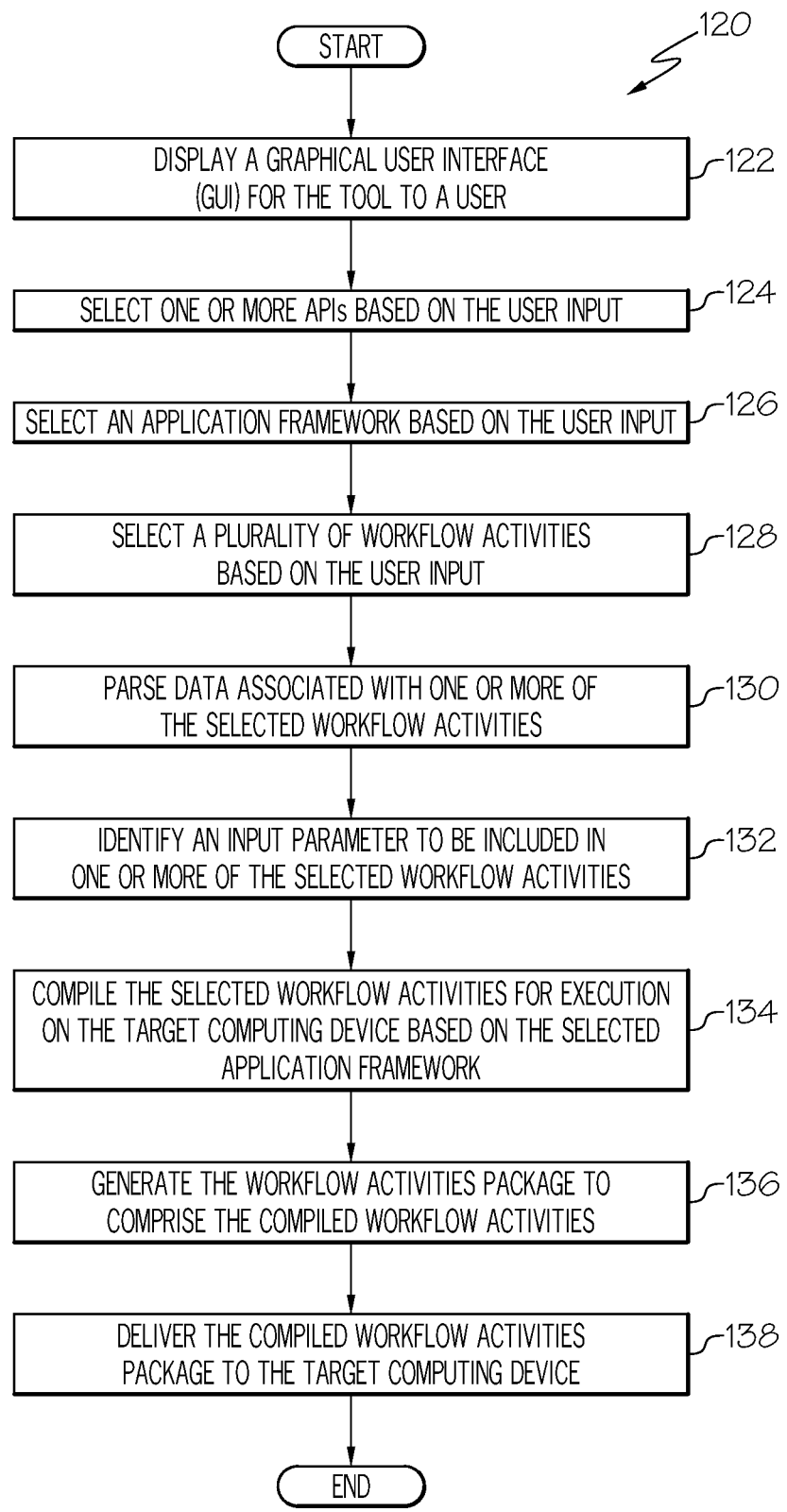
FIGS. 5A-5D are flow diagrams illustrating methods for generating workflow files according to one embodiment of the present disclosure.

FIGS. 5A-5D are flow diagrams illustrating methods for generating workflow files according to one embodiment of the present disclosure. Particularly, FIG. 5A is a flow diagram illustrating a method 120 for generating a workflow activity package for delivery to a target computing device 16 according to one embodiment of the present disclosure. Method 120 begins with displaying the GUI for RDK tool 40 on the client computing device 20 for the user (box 122). As previously stated, the RDK tool 40 may be executing locally on client computing device 20, remotely on application server 14, or both, and provides the GUI that displays a plurality of available APIs, as well as a plurality of available frameworks, for selection by the user. Other information may or may not be displayed by the GUI as needed or desired.

In operation, the user would select one or more APIs (box 124) as well as an application framework (box 126). As previously stated, the GUI displays a plurality of different application frameworks, each comprising a reusable set of software components that may be used to build the workflow activity package for delivery to the target device 16, and to execute the workflow activities on the target device 16. The user also selects, via the GUI, a plurality of workflow activities (box 128). The workflow activities are compatible with at least one of the selected APIs. In one embodiment, however, different workflow activities selected by the user are compatible with different APIs. Therefore, in one embodiment, the GUI provided by RDK tool 40 allows the users to select different workflow activities to include in the workflow activity package, and to associate different workflow activities in the workflow activity package with different APIs.

The user may then enter a command, for example, that controls the RDK tool 40 to parse the data associated with the selected activities (box 130). Such parsing exposes the parameters of the selected workflow activity, and as described in more detail later, allows the users creating the workflow activity package to identify parameters and values output by one workflow activity to another, different workflow activity for use by that different workflow activity (box 132).

Once the user is finished, the user may issue a command to cause the RDK tool 40 to compile the workflow activities for execution on the target computing device based on the first application framework selected by the user (box 134). Particularly, the RDK tool 40 compiles the source code associated with the selected workflow activities. The RDK tool 40 then generates the workflow activity package to comprise the compiled workflow activities (box 136), and delivers the compiled workflow activity package to the target device 16 for execution (box 138).

In some embodiments of the present disclosure, the workflow activities in the workflow share parameter values. For example, a first workflow activity in the workflow may have an output value that can be utilized by another workflow activity later in the workflow. To facilitate such sharing, the user creating the workflow uses the GUI of the RDK tool 40 to identify and bind the parameters across different workflow activities in the workflow.

Figure 5B:
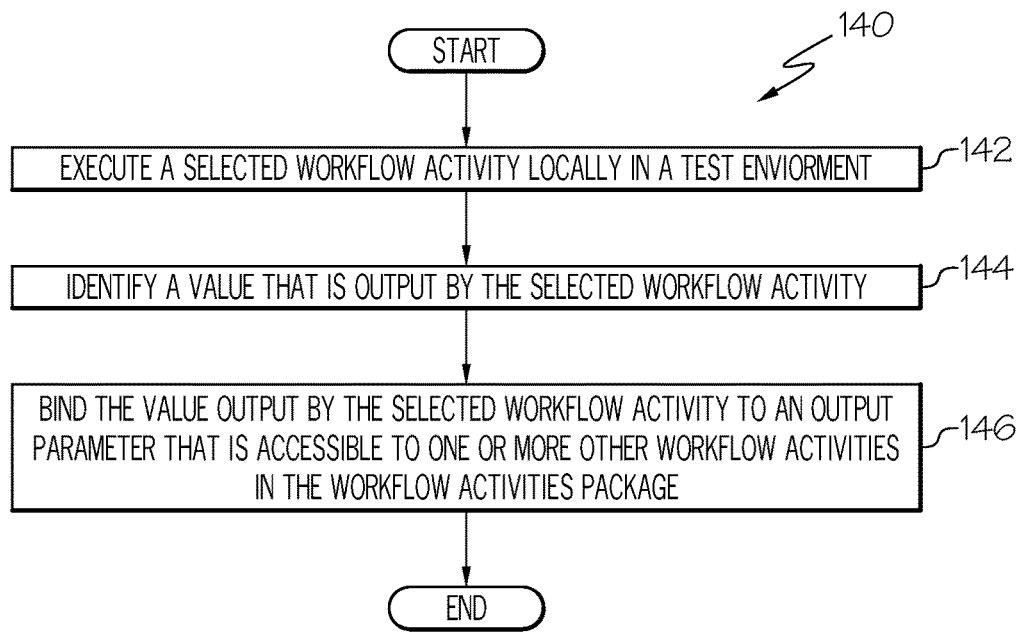
Figure 5C:
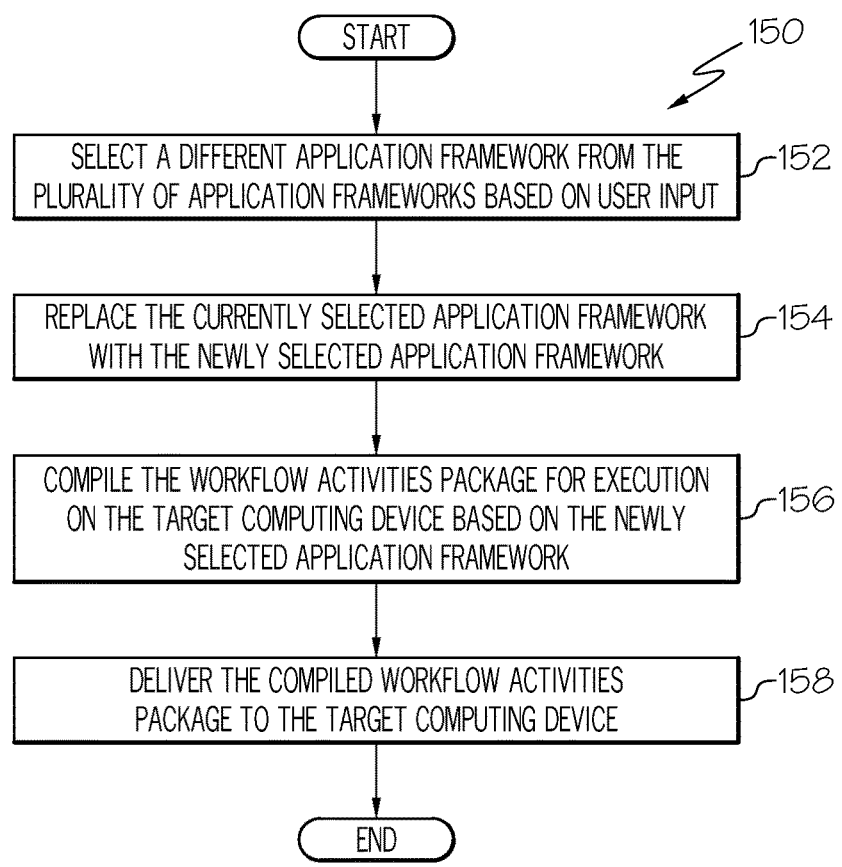

FIG. 5B is a flow diagram illustrating a method 140 for binding the values of one workflow activity to a global parameter so that one or more other workflow activities in the workflow are able to access those values. As seen in FIG. 5B, the user must first identify a particular output value of a first workflow activity that is to be shared with other workflow activities. To accomplish this, the RDK tool 40 provides a "test execution environment" in which the functions of the first workflow activity are executed (box 142). Executing the workflow activity in this test environment allows the user to view the values that are output by the first workflow activity. Once the user has identified a given output value (box 144), the user binds that output value to an output parameter (box 146).

By way of example, the RDK tool 40 may display the value or values output by the first workflow activity, along with their respective variable names, to a specially indicated area of the GUI. This allows the user to then manually enter the name of a desired variable into another specially marked area of the GUI associated with a given parameter that is accessible to other workflow activities in the workflow. Thereafter, upon execution of the workflow on the target device 16, underlying code in the workflow sets the given parameter to the output value of the first workflow activity. This binds the output of the first workflow activity to the global parameter that is available to other workflow activities, thereby providing access to that value by other workflow activities in the workflow.

Generally, conventional workflow development tools only operate with a specific, well-defined application framework, such as Product Asset Management (PAM), Reference Architecture (RA), and other workflow orchestration products, for example, associated with a target device. However, this limits conventional tools to generating workflows only for that specific framework. Further, all workflow activities in the workflow can only be written for that particular framework. Thus, if the functionality of a particular workflow activity is desired for a different framework, the user would have to utilize a completely different tool associated with the different framework, and recreate the workflow activity. This also requires the user to have specific knowledge of the particular framework on which the workflow activities will operate. Embodiments of the present disclosure, such as method 150 seen in FIG. 5C, for example, avoid such problems by allowing a user to dynamically switch between a plurality of different application frameworks.

In more detail, the RDK tool 40 in this embodiment is preconfigured to operate with a plurality of different application frameworks, such as those frameworks mentioned above. Further, method 150 assumes that a workflow activity package has been created by the user using a one of those application frameworks. If the user decides to create the workflow activity package for another target device having a different framework, the user utilizes the GUI of RDK tool 40 and simply selects a different application framework (box 152). The various frameworks available to the user may be listed, for example, in a drop-down box on the GUI. Selecting the new application framework from the GUI effectively causes the RDK tool 40 to replace the currently selected application framework with the newly selected application framework (box 154). The user may then use the RDK tool 40 to compile the workflow activity package based on the newly selected framework (box 156), and deliver the compiled package to the target device 16 (box 158).

In addition, the RDK tool 40 of the present disclosure also allows a user to create new workflow activities from existing workflow activities, and modify existing workflow activities. Such functions allow users to create a variety of different workflow activities, as well as their corresponding workflows, very quickly.

Figure 5D:
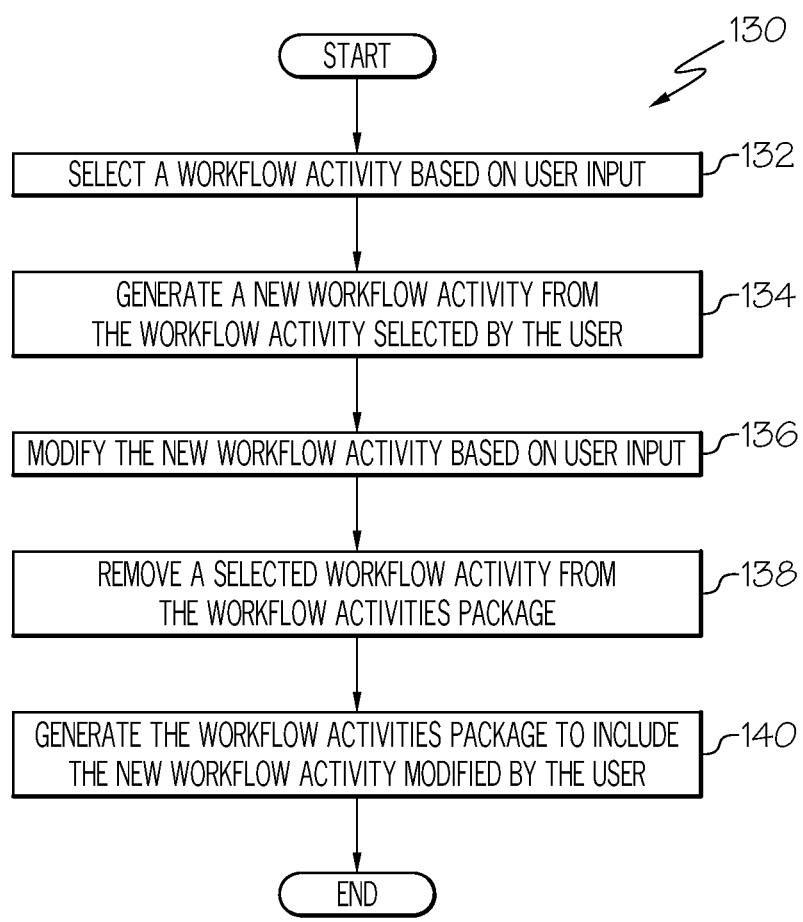

FIG. 5D is a flow diagram that illustrates a method 160 for modifying the workflow activities in a given workflow. Method 160 begins with the user selecting, using the GUI of RDK tool 40, a desired workflow activity (box 162). By way of example, the selected workflow activity may comprise program code that configures a processor circuit of target device 16 to read one or more values from a specific file. If the user wanted to create a similar workflow activity in which a different value would be read from the same or a different file, the user would first generate the new workflow activity based on the selected workflow activity (box 164). In one embodiment, generating the new workflow activity may be performed by the RDK tool 40 copying the contents of the selected workflow file to a new workflow file. Once generated, the user may provide the information defining the new values and/or file to be read for the newly generated workflow activity (box 166). Additionally, if the user wanted to remove a given workflow activity that is no longer needed from the workflow, the user would simply select the desired workflow activity on the GUI of RDK tool 40, and issue a command to remove the selected workflow activity (box 168). Regardless of the modifications, however, the RDK tool 40 is configured to re-generate the workflow activity package to include the new and/or modified workflow activities based on a user input command.

Figure 6:
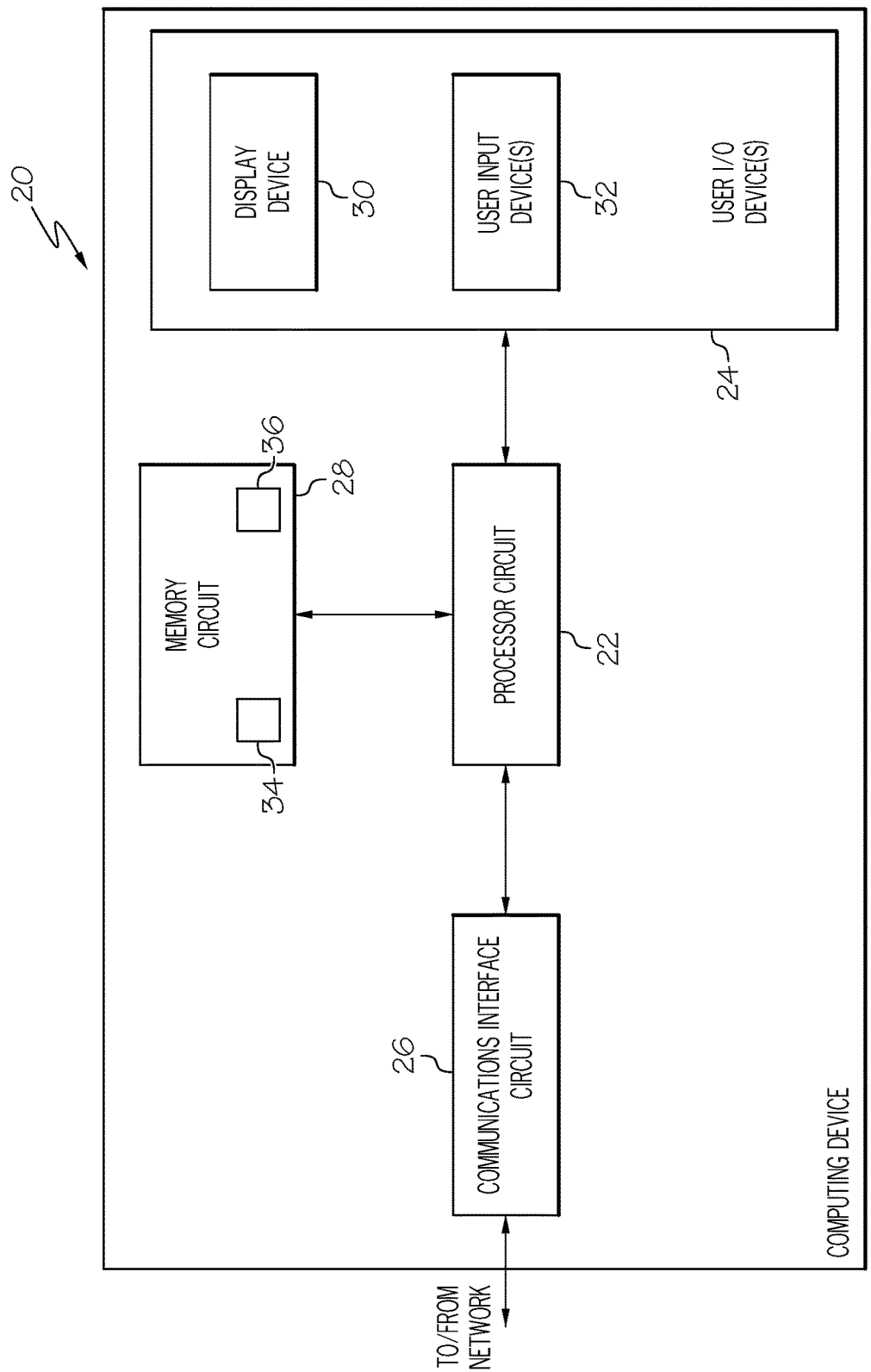
FIG. 6 is a block diagram illustrating some component parts of a computing device configured to generate workflow files according to one embodiment of the present disclosure.

FIG. 6 is a block diagram illustrating some of the functional components of a client computing device 20 configured according to one embodiment of the present disclosure. As seen in FIG. 6, client computing device 20 comprises a processor circuit 22, a user Input/Output (I/O) interface 24, a communications interface circuit 26, and a memory circuit 28. Those of ordinary skill in the art will readily appreciate that the components shown herein are merely for illustrative purposes, and that client computing device 20 may comprise other components not specifically shown herein, as needed or desired.

Processor circuit 22 may be implemented by one or more microprocessors, hardware, firmware, or a combination thereof, and generally controls the operation and functions of client computing device 20 according to the appropriate standards. Such operations and functions include, but are not limited to, communicating with the application server 14 via network 12 to perform the functions described above with respect to the RDK tool 40, which may execute on the application server 14, as well as for delivering the compiled workflow activity package to the target device 16, as previously described. In this regard, the processor circuit 22 may be configured to the implement logic and instructions associated with the client tier 50 portion of RDK tool 40 according to the embodiments as previously described.

The user I/O interface 24 provides the components necessary for a user to interact with client computing device 20, and thus, comprises a display 30 and one or more user input devices 32, such as a keyboard and a mouse, for example. The display 30 is configured to display the GUI provided by the RDK tool 40 in accordance with the associated code in the client tier 50, while the input devices allow the user to navigate the GUI, make selections from information displayed by the GUI, and issue commands via the GUI to build and compile the workflow activities.

The communications interface circuit 26 facilitates communications with the application server 14 and the target device 16 via network 12. To accomplish this function, the communications interface 26 may utilize any protocol or protocols known in the art to communicate messages and data in accordance with the previously described embodiments. In one embodiment, communications interface 26 comprises an ETHERNET card that communicates using the well-known Transmission Control Part (TCP)/IP protocols. However, the present disclosure also allows for the use of other communication protocols known in the art.

Memory circuit 28 may comprise any non-transitory, solid state memory or computer readable media known in the art. Suitable examples of such media include, but are not limited to, ROM, DRAM, Flash, or a device capable of reading computer-readable media, such as optical or magnetic media. The memory circuit 28 stores programs and instructions, such as the code 34 and data 36 for executing the functions of client tier 50 that control the processor circuit 22 to perform the functions previously described.

Figure 7:
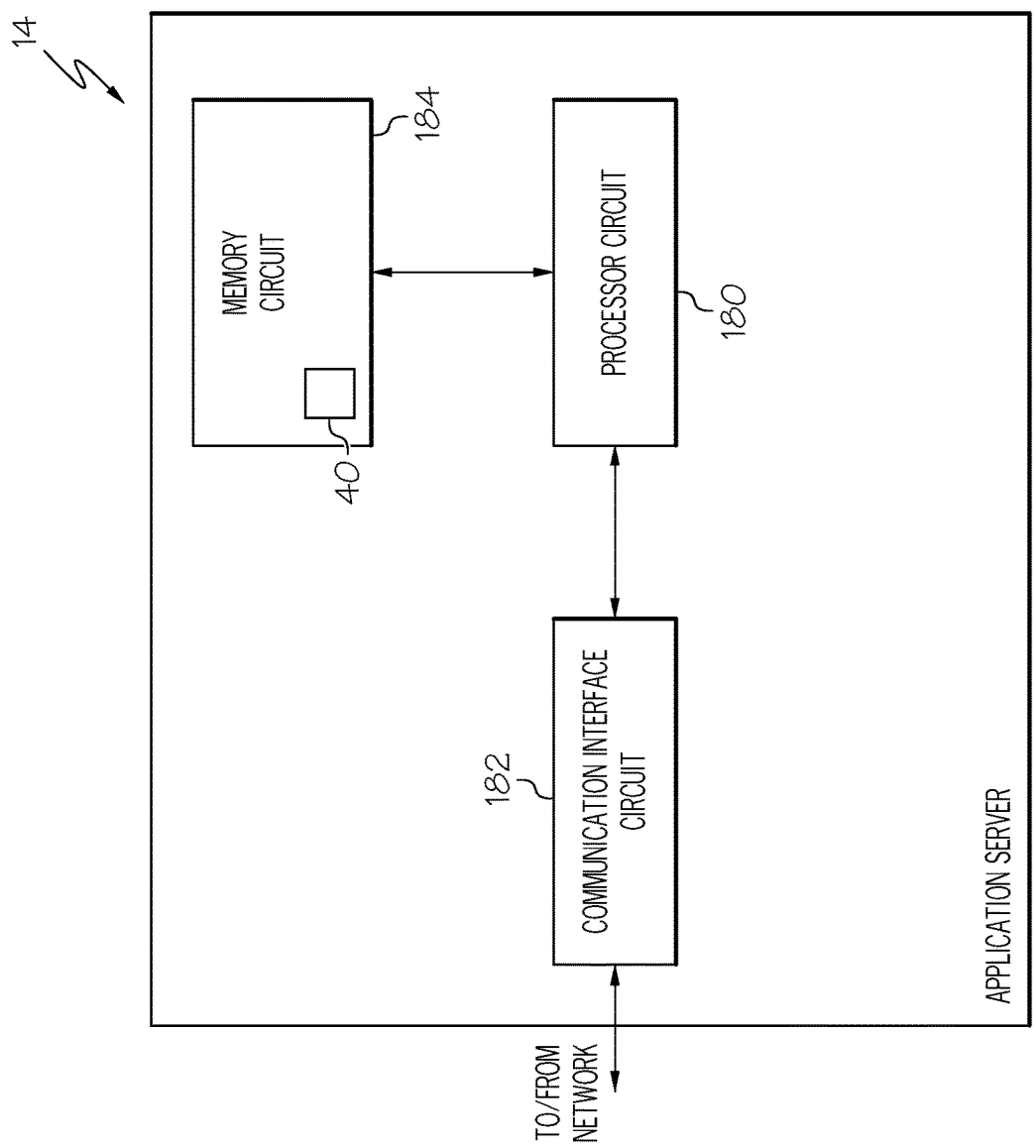
FIG. 7 is a block diagram illustrating some component parts of an application server configured to generate workflow files according to one embodiment of the present disclosure.

FIG. 7 is a block diagram illustrating some of the functional components of an application server 14 configured according to one embodiment of the present disclosure. As seen in FIG. 7, application server 14 is a network-based computing device that comprises a processor circuit 180, a communications interface circuit 182, and a memory circuit 184. As above, those of ordinary skill in the art will readily appreciate that the components shown herein are merely for illustrative purposes, and that application server 14 may comprise other components not specifically shown herein, as needed or desired.

The processing circuit 180 is similar to processing circuit 22 of client computing device 20 in that it may be implemented by one or more microprocessors, hardware, firmware, or a combination thereof, and generally controls the operation and functions of application server 14 according to the appropriate standards. In embodiments of the present disclosure, however, processing circuit 180 is configured to perform the previously described functions in accordance with the logic and data of the RDK tool 40. Such functions include, but are not limited to, providing the client computing device 20 with the GUI for RDK tool 40, information and data for display to the user via the GUI, and providing the capabilities and resources needed by the user to generate, compile, and deliver a workflow activity package, as previously described. Such communications are facilitated over network 12 via a communications interface circuit 182.

The memory circuit 184, which also comprises any non-transitory, solid state memory or computer readable storage media known in the art, is configured to store the code and data associated with the RDK tool 40. Such code and data includes, but is not limited to, the code and data associated with the server tier 60 portion of the RDK tool 40.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   selecting, responsive to receiving user input at a Graphical User Interface (GUI):
   an Application Programming Interface (API);
   a first application framework for building a plurality of workflow activities into a workflow activity package, wherein the first application framework comprises a reusable set of software components and is selected by the user from a plurality of application frameworks; and
   the plurality of workflow activities that are compliant with the API, and wherein each workflow activity comprises code defining one or more actions to be performed by a target computing device;
   compiling the plurality of workflow activities for execution on the target computing device based on the first application framework selected by the user; and
   generating the workflow activity package to comprise the compiled plurality of workflow activities.

2. The computer-implemented method of claim 1 wherein the plurality of workflow activities comprises first and second workflow activities, and wherein the method further comprises, prior to compiling the plurality of workflow activities for execution on the target computing device, binding a value output by the first workflow activity to an output parameter that is accessible to the second workflow activity.

3. The computer-implemented method of claim 2 further comprising parsing data associated with the first workflow activity to identify the value output by the first workflow activity.

4. The computer-implemented method of claim 3 wherein parsing data associated with the first workflow activity to identify the value output by the first workflow activity comprises:
   executing the first workflow activity in a test environment; and
   identifying the value from a result of the execution of the first workflow activity in the test environment.

5. The computer-implemented method of claim 1 further comprising:
   selecting a second application framework based on input received from the user, wherein the second application framework is selected from the plurality of application frameworks by the user and comprises a different reusable set of software components for building the workflow activity package;
   replacing the first application framework with the second application framework; and
   compiling the plurality of workflow activities for execution on the target computing device based on the second application framework.

6. The computer-implemented method of claim 1 wherein selecting an Application Programming Interface (API) comprises selecting first and second different APIs responsive to receiving the user input at the GUI.

7. The computer-implemented method of claim 6 wherein selecting, responsive to the user input, a plurality of workflow activities that are compliant with the API comprises:
   selecting a first workflow activity that is compliant with the first API; and
   selecting a second workflow activity that is compliant with the second API.

8. The computer-implemented method of claim 1 wherein selecting, responsive to the user input, a plurality of workflow activities that are compliant with the API comprises:

selecting a first workflow activity from the plurality of workflow activities;

generating a new workflow activity from the first workflow activity; and modifying the new workflow activity based on input received from the user.

9. The computer-implemented method of claim 7 wherein generating the workflow activity package to comprise the compiled plurality of workflow activities comprises generating the workflow activity package to further comprise the modified new workflow activity.

10. The computer-implemented method of claim 1 further comprising removing a selected workflow activity from the workflow activity package.

11. A computing device comprising:
a display configured to display a graphical user interface (GUI) for a tool to a user, wherein the tool is configured to generate a workflow activity package for execution on a target computing device based on user input received by the GUI; and
a processing circuit configured to, responsive to receiving user input at GUI:
    select an Application Programming Interface (API);
    select a first application framework for building a plurality of workflow activities into the workflow activity package, wherein the first application framework comprises a reusable set of software components and is selected by the user from a plurality of application frameworks; and
    select the plurality of workflow activities, wherein each workflow activity comprises one or more actions to be performed by the target computing device and is compliant with the API;
    compile the workflow activities for execution on the target computing device based on the first application framework selected by the user; and
    generate the workflow activity package to comprise the compiled plurality of workflow activities.

12. The computing device of claim 11 wherein the plurality of workflow activities comprises a first workflow activity and a second workflow activity, and wherein, prior to compiling the plurality of workflow activities for execution on the target computing device, the processing circuit is further configured to bind a value output by the first workflow activity to an output parameter that is accessible to the second workflow activity.

13. The computing device of claim 12 wherein to bind a value output by the first workflow activity to an output parameter that is accessible to the second workflow activity, the processing circuit is configured to:
    execute the first workflow activity in a test environment;
    parse the output of the first workflow activity to identify a value that is output by the first workflow activity executed in the test environment; and
    bind the value output by the first workflow activity to the output parameter.

14. The computing device of claim 11 wherein the processing circuit is further configured to:
    select a second application framework based on input received from the user, wherein the second application framework is selected from the plurality of application frameworks by the user and comprises a different reusable set of software components for building the workflow activity package;
    replace the first application framework with the second application framework; and
    compile the workflow activities for execution on the target computing device based on the second application framework.

15. The computing device of claim 11 wherein to wherein to select an Application Programming Interface (API), the processor circuit is configured to select first and second different APIs responsive to receiving the user input at the GUI.

16. The computing device of claim 15 wherein to select a plurality of workflow activities that are compliant with the API, the processing circuit is configured to:
    select a first workflow activity that is compliant with the first API; and
    select a second workflow activity that is compliant with the second API.

17. The computing device of claim 11 wherein the processor is further configured to alter contents of the workflow activity package to be executed on the target computing device.

18. The computing device of claim 17 wherein the processor circuit is further configured to:
    select a first workflow activity from the plurality of workflow activities based on user input received t the GUI;
    generate a new workflow activity from the first workflow activity;
    modify the new workflow activity based on input received from the user; and
    generate the workflow activity package to further comprise the new workflow activity.

19. The computing device of claim 17 wherein the processor circuit is further configured to remove a selected workflow activity from the workflow activity package.

20. The computing device of claim 11 further comprising a communications interface circuit communicatively connecting the computing device to the target computing device, and wherein the processor circuit is further configured to deliver the compiled workflow activity package to the target computing device.

21. A computer-readable storage medium comprising computer-readable code that, when executed by a processing circuit on a computing device, configures the processing circuit to:
    display a graphical user interface (GUI) for a tool to a user, wherein the tool is configured to generate a workflow activity package for execution on a target computing device;
    select, responsive to receiving user input at the GUI:
        an Application Programming Interface (API);
        a first application framework for building a plurality of workflow activities into a workflow activity package, wherein the first application framework comprises a reusable set of software components and is selected by the user from a plurality of application frameworks;
        the plurality of workflow activities that are compliant with the API, and wherein each workflow activity comprises code defining one or more actions to be performed by a target computing device; and
    compiling the plurality of workflow activities for execution on the target computing device based on the first application framework selected by the user;
    generating the workflow activity package to comprise the compiled plurality of workflow activities.

* * * * *